United States Patent
Kato

[11] 4,258,694
[45] Mar. 31, 1981

[54] FRYING PAN WITH MECHANISMS FOR PREVENTING OIL SPLASHING AND FIRE OCCURRENCE

[76] Inventor: Kyosuke Kato, 58-22, Gejohcho, Kasugai City, Aichi Prefecture, Japan

[21] Appl. No.: 29,695

[22] Filed: Apr. 13, 1979

Related U.S. Application Data

[63] Continuation-in-part of Ser. No. 908,669, May 23, 1978.

[51] Int. Cl.³ .............................................. F24C 15/20
[52] U.S. Cl. ................................ 126/299 C; 220/335; 16/135; 16/191; D7/131; D7/134
[58] Field of Search ............... 126/373, 389, 300, 381, 126/382, 299 C, 214 D; 99/403; 220/335, 334, 85 CH, 345; D7/131, 134; 222/180, 545, 556; 16/135, 191, 143, 139, 82

[56] References Cited

U.S. PATENT DOCUMENTS

| Re. 17,370 | 7/1929 | Smith | 126/381 X |
|---|---|---|---|
| 576,887 | 2/1897 | Pratt | 220/335 |
| 656,855 | 8/1900 | Pimlott | 126/299 C |
| 948,491 | 2/1910 | Andreas et al. | 126/389 X |
| 1,395,554 | 11/1921 | Brown | 220/335 |
| 1,807,271 | 5/1931 | Asadoorian | 126/299 C |
| 2,350,243 | 5/1944 | MacKay | 129/299 C X |
| 2,826,327 | 3/1958 | Gerhardt | 220/335 |
| 2,888,162 | 5/1959 | Herpich | 220/334 |
| 3,930,594 | 1/1976 | Jungman | 220/335 |

*Primary Examiner*—Samuel Scott
*Assistant Examiner*—Randall L. Green
*Attorney, Agent, or Firm*—Fred Philpitt

[57] ABSTRACT

A frying pan is provided with a lid plate covering almost the entire opening of the pan, and this lid plate is transparent so that the inside of the pan can be seen by a user from the outside, and the lid plate is provided with a mounting mechanism for detachably mounting the lid plate to the pan, and is provided with a gas discharging passageway having a gap for discharging the gas to cause it to flow in a curved path which is formed between the lid plate and an edge of the opening of the frying pan in order to capture the oil splashing almost completely in the lid closed condition, and is provided with an opening/closing mechanism for closing the lid by maintaining a gap between the lid plate and the edge of opening portion of the frying pan.

3 Claims, 7 Drawing Figures

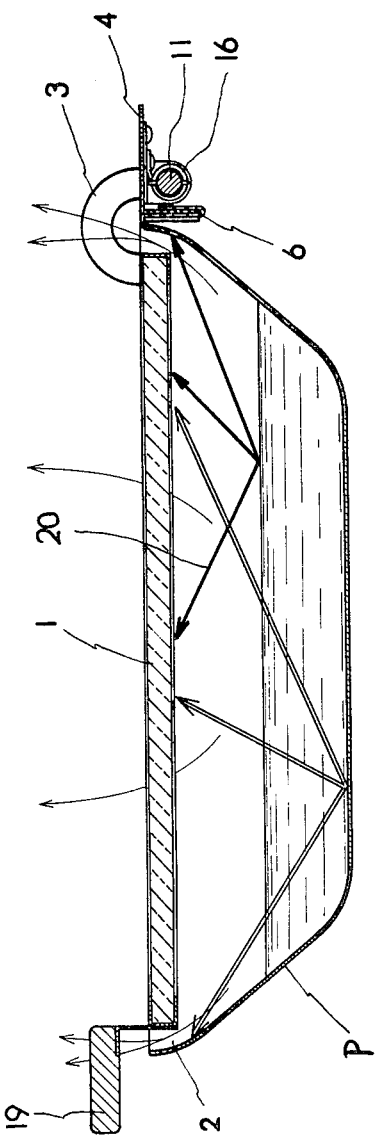

FRYING PAN WITH MECHANISMS FOR PREVENTING OIL SPLASHING AND FIRE OCCURRENCE

RELATED APPLICATION

This application is a continuation-in-part application of my prior application, Ser. No. 908,669 filed on May 23, 1978.

BACKGROUND OF THE INVENTION

This invention relates to a frying pan for cooking fried food or deep-fat fried food provided with a lid for preventing oil splashing and occurrence of fire, and more particularly in a relatively shallow bottom frying pan. It relates more particularly to a frying pan provided with a lid plate over an opening surface of the pan, and this lid plate has a mechanism for detachably mounting the lid plate on the pan, and is provided with an opening/closing mechanism for setting the lid plate to retain a gap formed between the lid plate and the edge of opening portion of the pan when the lid plate is placed on the pan, and is provided with a gas discharging passageway having a gap for discharging the gas formed between the lid plate and an edge of opening portion of the frying pan, and the lid plate is transparent so that the inside of the frying pan can be seen by a user.

Heretofore, when cooking fried food by using a cooking oil, as a means of preventing oil splashing and for preventing fire resulting from flames in the pan, it may generally suffice to place the lid on the frying pan, but drawbacks are encountered.

By placing the lid on the pan, the oil splashing can be positively prevented, and at the same time, danger of fire can be prevented on account of lack of oxygen inside the pan, but if the lid itself is opaque, the inside of the pan cannot be observed so that the lid has to be made of transparent material. However, as a large volume of steam is generated from the pan, such a specially devised transparent lid becomes impractical as it collects moisture immediately thereby spoiling the inside observing function.

The present invention is intended to solve the problems of oil splashing and occurrence of fire when frying is performed with the use of a shallow bottom pan.

SUMMARY OF THE INVENTION

An object of the present invention is to provide a lid plate capable of covering an entire opening surface of a frying pan so as to prevent the oil splashing from the frying pan during the cooking.

Another object of the present invention is to provide a mounting mechanism for detachably mounting the lid plate on the frying pan, so that the lid plate can be removed when the pan is either used for frying cooking that makes the lid inconvenient or when the oil splashing is almost non-existent, and the lid plate can be installed in place when it is used for frying which involves strong oil splashing or is used for cooking fried food as in a deep-fat frying pan.

A further object of the present invention is to provide a transparent lid plate to enable a user to see through the inside of the frying pan from the outside.

A still further object of the present invention is to provide a gas discharging passageway having a ventilating gap between the lid plate and an edge of opening portion of the frying pan so that the oil does not splash and, the vapor or oil smoke generated in the frying pan is made to be discharged outside to thereby prevent the lid plate from collecting moisture which assures that the inside of the frying pan can be seen through positively.

A particular object of the present invention is to prevent the inflow of air from the outside by limiting the ventilating gap provided between the lid plate and the edge of the opening portion of the frying pan to a minimum, and to promote oxygen deficient condition in the frying pan so as to prevent the occurrence of fire.

BRIEF DESCRIPTION OF THE DRAWINGS

FIG. 7 is a vertical cross section similar to FIG. 2 showing another embodiment of the modified frying pan.

DETAILED DESCRIPTION OF THE INVENTION

Figure 1:
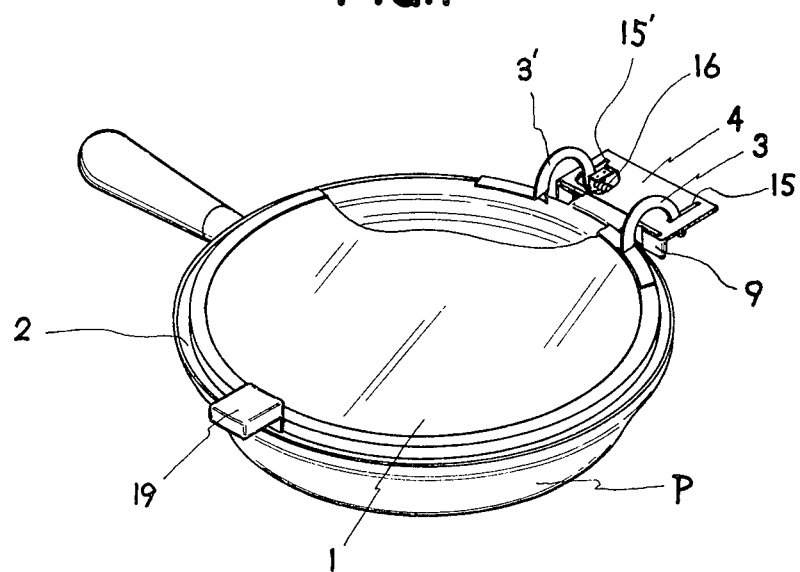
FIG. 1 is a perspective view showing a partially broken away view of the condition where the lid plate is mounted on the frying pan.

A pan according to the present invention is shown generally by the letter P and is generally called a frying pan with relatively shallow bottom. The frying pan P is provided with a lid plate 1 capable of covering the entire opening surface of the pan, and this lid plate 1 is provided with a mounting mechanism for detachably mounting the lid plate on the frying pan P, and a gas discharging passageway having a ventilating gap 2 between the lid plate 1 and an edge of opening portion of the frying pan P, and an opening/closing mechanism for openably operating the lid plate 1 maintaining the ventilating gap 2 between the lid plate 1 and the frying pan P.

The lid plate 1 is formed of a transparent plate having heat resistant properties such as thick glass plate, and the inside of the frying pan P is made observable from the outside, and a pair of swiveling arm members 3, 3' are projected from one end side of the lid plate 1, and the swiveling arm members 3, 3' are installed on an opening/closing mechanism provided on a bearing plate 4 so that the lid plate 1 can be rotatably supported with the bearing plate 4 as a pivot.

The mounting mechanism of the lid plate 1 is provided with a U-shaped cross section connecting portion 6 having a sandwiching gap 5 that is integrally fixed to a predetermined location of the edge of opening portion of the frying pan P, and the bearing plate 4 of the lid plate 1 is integrally provided with a vertical wall portion 7 whose inside is bent in a right angle direction downward, and bending member portions 9, 9' with gap 8, 8' are provided at both ends of the vertical wall portion 7. The vertical wall portion 7 of the bearing plate 4 is inserted into the gap 5 of the connecting portion 6, and at the same time, is sandwiched with both end edges of the connecting portion 6 by means of the bending member portions 9, 9' to fix the lid plate 1. In case the lid plate 1 is not needed in the cooking of fried food the vertical wall portion 7 of the bearing plate 4 is merely pulled out from the connecting portion 6 so that the mounting and detachment of the lid plate 1 can be performed extremely simply, and the fixed condition is firmly maintained.

Figure 2:
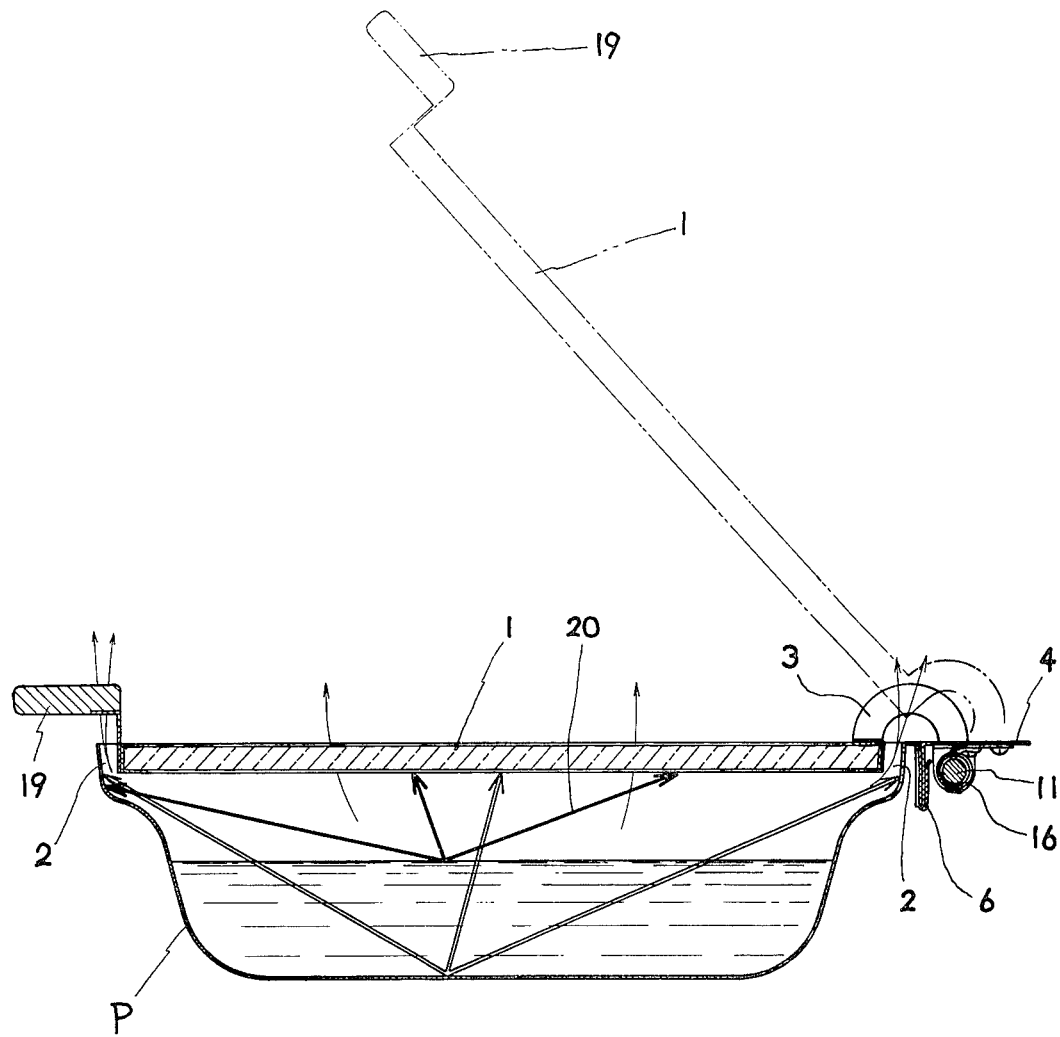
FIG. 2 is a vertical cross section thereof.

The lid plate 1 is provided with a gas discharging passageway in such a way that it is formed in a shape and size to provide a small ventilating gap 2 between itself and the edge of opening portion of the frying pan P at a depth position where the upper surface of the lid plate 1 becomes almost flush with the upper edge of the opening of the frying pan P, and when the opening surface of the frying pan P is covered with the lid plate 1, as shown in FIG. 2, all oil splashing is kept inside of the frying pan P and at the same time curved flow of the gas such as steam or oil smoke rising from the hollow portion of the frying pan P is utilized to discharge the gas from the ventilating gap 2.

As the means for making the lid plate 1 stationary at a position where the ventilating gap 2 is maintained, various means can be provided such as providing a hook at a predetermined location of the frying pan P or providing a proper stopper to prevent dropping of the lid plate 1 in the frying pan P beyond the point desired, but in the present invention, dead load of the lid plate 1 loading on the swiveling arm members 3, 3' is made stationary with an arbitrary open angle by the opening/closing mechanism provided on the bearing plate 4 of the lid plate 1 whereby the ventilating gap 2 is maintained.

Figure 4:
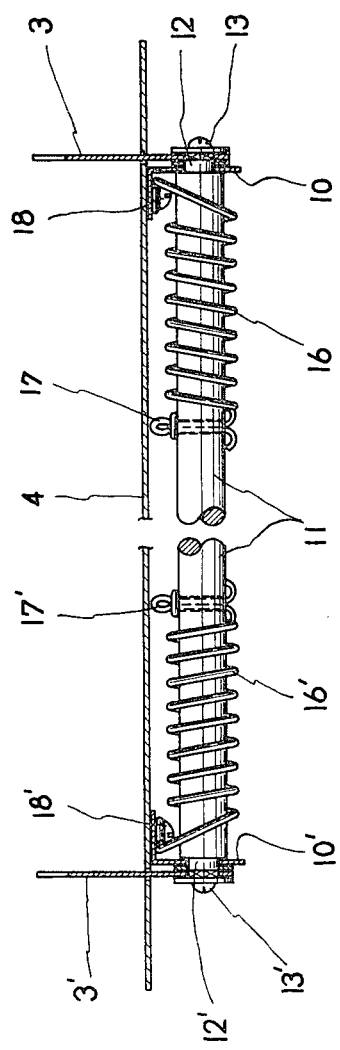
FIG. 4 is an enlarged view showing an essential part of an opening/closing mechanism for the lid plate.

The opening/closing mechanism, as shown in FIG. 4, is provided in such a way that an operating shaft 11 is axially installed on L-shaped bearing members 10, 10' screwed or welded to right and left end portions of the reverse surface of the bearing plate 4 so as to be rotatable with reduced diameter portions 12, 12' provided at both ends thereof, and base end portions of the swiveling arm members 3, 3' are integrally fixed to angular short shaft portions 13, 13' extending and projecting from the reduced diameter portions 12, 12' thereby interlocking the swiveling arm members 3, 3' accompanied by the turning motion of the operating shaft 11, and the swiveling arm members 3, 3' are projected outward from elongate guide slits 15, 15' perforated on the bearing plate 4, and the tips of the swiveling arm members 3, 3' are fixed and set on the upper portion of the lid plate 1. Springs 16, 16' are coiled at right and left of the operating shaft 11, and the inner end portions of coil springs 16, 16' are fixed to the operating shaft 11 with pins 17, 17', and the outer end portions are fixed to the bearing members 10, 10' with screws 18, 18'.

The guide slits 15, 15' perforated on the bearing portion 4 are of a length sufficient to control the movement of the swiveling arm members 3, 3' so that an opening/closing angle of the lid plate 1 is within the desired range. When the base end portions of the swiveling arm members 3, 3' and short shaft portions 13, 13' of the operating shaft 11 are to be fixed, the operating shaft 11 is twisted and turned previously to accumulate return turning elastic force on the coil springs 16, 16' whose ends are connected to the operating shaft 11 and thereafter the fixing is performed. In this case, the return turning resiliency of the springs 16, 16' and the weight of the lid plate 1 are properly balanced by appropriately selecting the spring force of the coil springs 16, 16' used or the twisting frequency of the operating shaft 11, and as a result of this balancing, when the lid plate 1 is opened or closed, the gravity of the lid plate 1 is made extremely light so that it is made stationary at an optional position in an opening/closing allowable angle controlled by the guide slits 15, 15'. The lid plate 1 is statically installed by being made so as to have almost no gravity. When the lid plate 1 is closed to cover the frying pan P, the predetermined ventilating gap 2 can be maintained between the lid plate 1 and the edge of opening portion of the frying pan P.

Accordingly, the lid plate 1 of the present invention can be used detachably on the frying pan P by connecting the connecting portion 6 of the frying pan P to the vertical wall portion 7 of the bearing portion 4 or pulling it therefrom. In the condition where the lid plate 1 is closed on the frying pan P, a knob 19 provided on the lid plate 1 is lifted to manipulate the opening operation. The lid plate 1 can be opened or closed in the almost gravityless condition by the opening/closing mechanism, and at the same time, it can be made static with an optional opening angle, for example, in the case where the food in the frying pan P is turned, the lid plate 1 is opened slightly just enough to allow insertion of chopsticks between the frying pan P and the lid plate 1, whereby the food can be turned while preventing the oil splashing to the outside. In the lid plate 1 closed condition, the ventilating gap 2 provided between the lid plate 1 and the edge of opening portion of the frying pan P, as shown with the arrow mark 20 in FIG. 2, the splashing of oil generated inside of the frying pan P is prevented from going outside from the ventilating gap 2, discharging the gas only such as vapor or oil smoke. As a result, the inside of the frying pan P during cooking can be seen through the transparent lid plate 1. Since the gas is discharged constantly from the inside of the frying pan P, the outside air hardly flows through the ventilating gap 2 into the inside of the frying pan P, thereby causing the inside of the frying pan P to be in an oxygen deficient condition, and even if the temperature of the inside of the frying pan P rises to a high temperature, there is no danger of causing combustion, and due to emergency during cooking, assuming if a cooking person leaves the kitchen for a long time, as long as the lid plate 1 is placed on the frying pan P, there is no danger that the frying pan P will be enveloped in flames, and thus the cause of fire during cooking with use of oil can be preventing before it happens.

Therefore, the present invention can solve two of the biggest troubles namely the prevention of oil splashing and the occurrence of fire in a pan.

By the way, as an embodiment of the present invention, the ordinary round type frying pan P is illustrated, but there should be no change in the manipulation with respect to mechanisms even if it is angular type.

Figure 5:
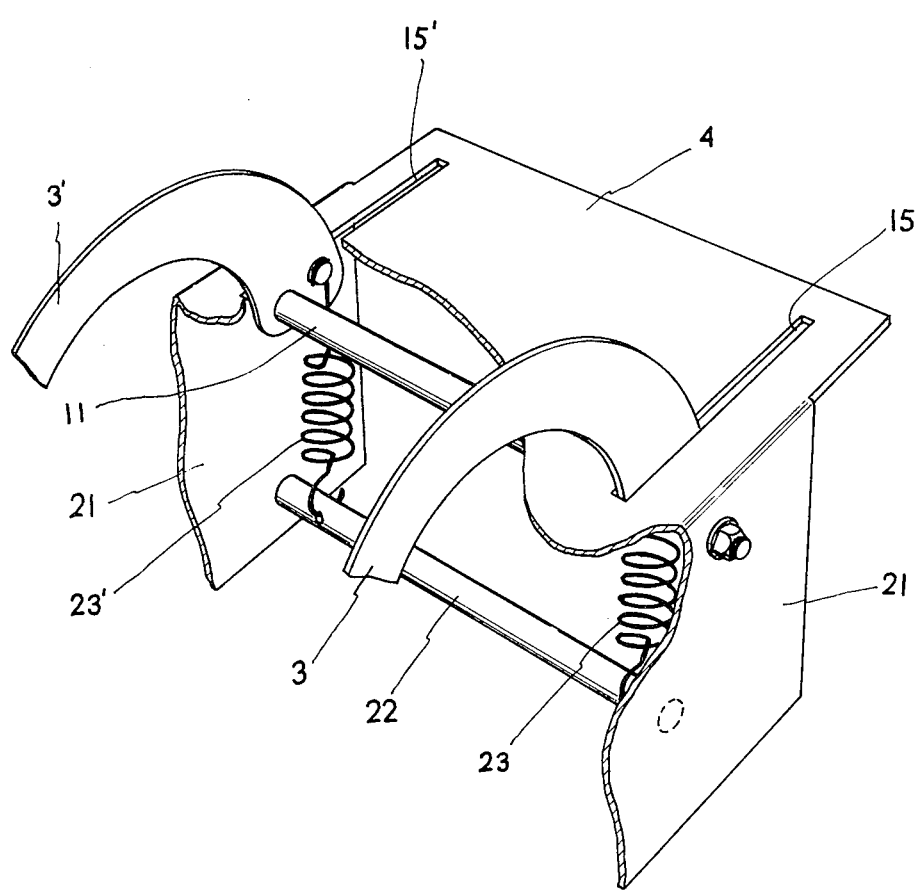
FIG. 5 is a perspective view showing an opening/closing mechanism of the lid plate of another embodiment of the present invention.

Also, FIG. 5 shows another embodiment related to the opening/closing mechanism of the lid plate 1, and side walls 21, 21' are provided at both sides of the bearing plate 4, and a fixing lever 22 is mounted and fixed to the side walls 21, 21' at a position immediately below the operating shaft 11, and the return springs 23, 23' are fixed to a fixing lever 22 at their lower ends, and its upper end is fixed to the swiveling arm members 3, 3'. This arrangement is made possible by the utilization of contraction of the ordinary spring, and there is no change functionally from the ones shown in FIG. 4.

Figure 3:
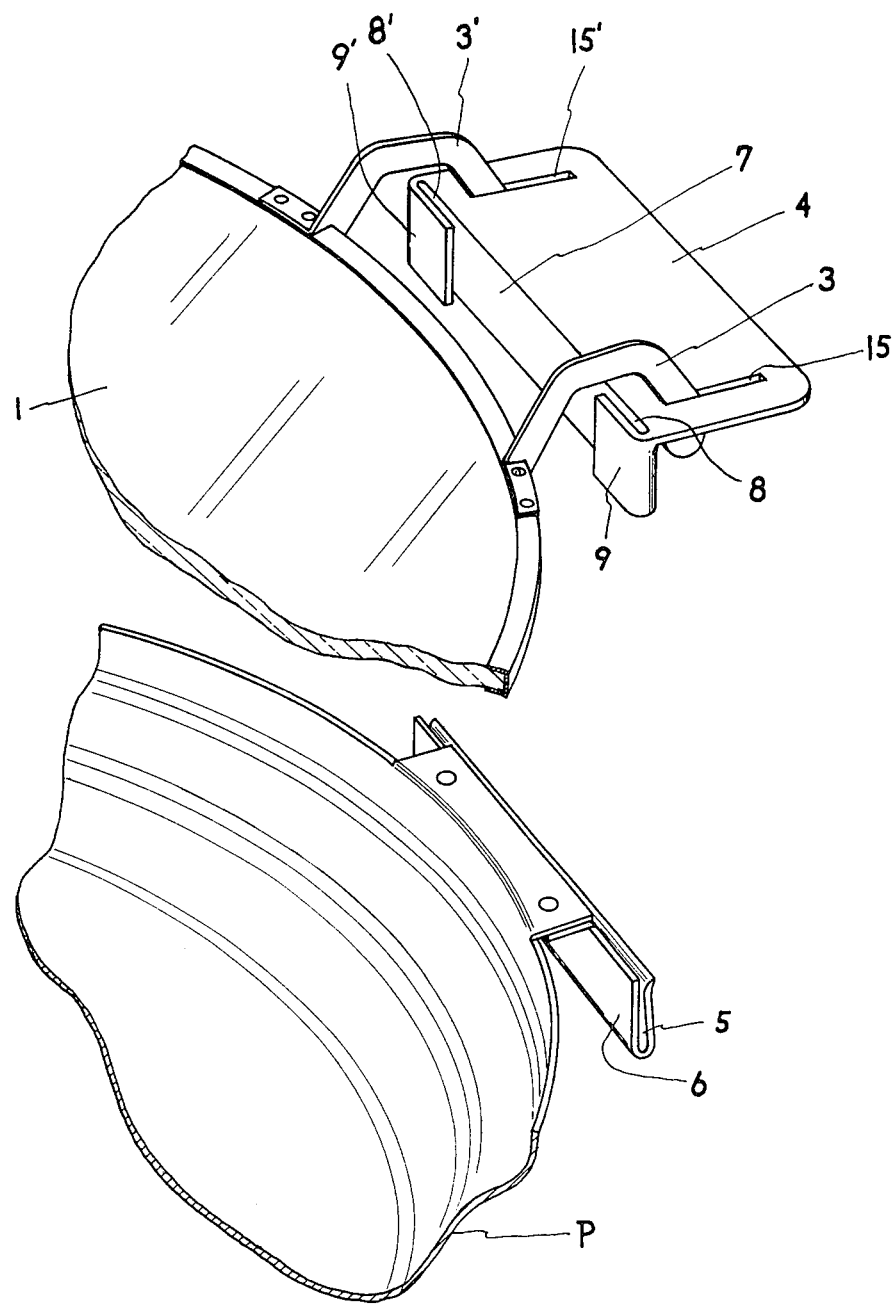
FIG. 3 is a partial perspective view showing a mounting mechanism of the lid plate.
Figure 6:
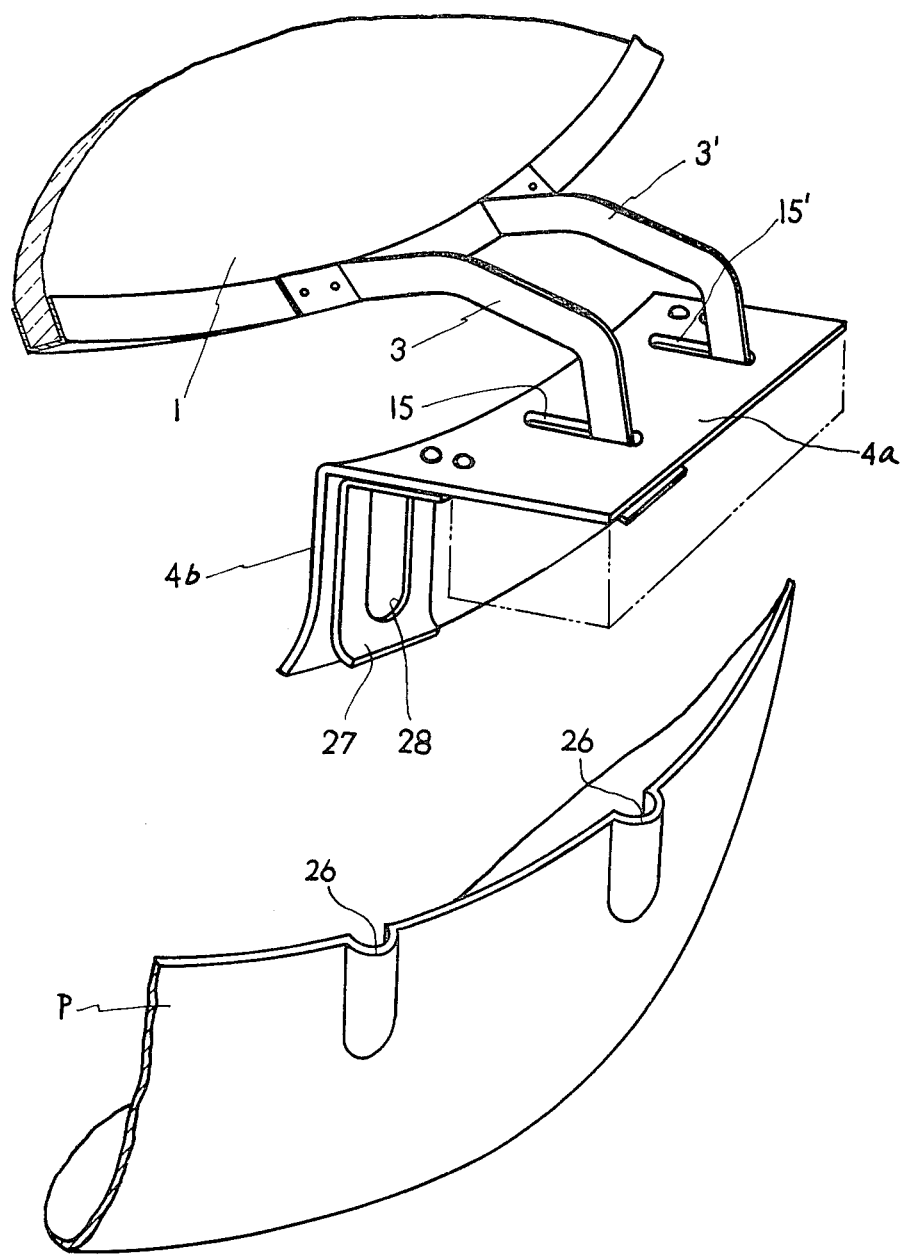
FIG. 6 is a fragmentary perspective view showing a mounting mechanism of the lid plate of another embodiment related to the present invention.

FIG. 6 shows another embodiment whose gist is identical with the connecting portion of the present invention shown in FIG. 3, and an engaging projection 26 projected on the frying pan P is fitted to a notched portion 28 of the spring plate 27 through the corresponding space of the spring plate 27 connected to the reverse surface of the front end bending member 4b of a bearing plate 4a whereby the lid plate 1 and the frying pan P are integrally coupled. As described in the foregoing, there are numerous methods for detaching mechanism of the lid plate 1 and the frying pan P.

FIG. 7 is a vertical cross section similar to that of FIG. 2, and showing that the gist of the present invention can be applied without regard to the outer shape of the frying pan P.

By the way, as an applicable example of the present invention, in case oil frying cooking and smothering cooking are intended to be performed simultaneously with the frying pan, it is preferable that the gap for discharging gas formed positively between lid plate and the edge of the opening portion of the frying pan be closed intentionally, and for this purpose, a metal ring is separately prepared for the edge of opening portion of the frying pan and may be detachably fitted thereon.

As described in the foregoing, the present invention relates to a frying pan demonstrating excellent versatility which can be used for all types of cooking such as regular frying, deep-fat frying and smothering and which can be utilized satisfactorily since it is safe and easy to handle.

What is claimed is:

1. A frying pan and cover combination for minimizing oil splashings and the occurrence of fire comprising:
   (A) a frying pan having an upwardly concave configuration that includes upwardly extending side walls that terminate in an upper perimeter edge portion,
   (B) a transparent cover plate for said frying pan, said cover plate having an area slightly less than the area within the boundaries of said upper perimeter edge portion of said frying pan,
   (C) a circumferential passageway between the outer perimeter of said transparent cover plate and the inner perimeter of said frying pan when said transparent cover plate is in a closed position with respect to said frying pan, said passageway serving as an outlet for gases and vapors generated in a frying pan, and
   (D) means for pivotally connecting said cover plate to said frying pan, said means including
      (1) a first bearing member on a portion of the upwardly extending side wall of said frying pan and extending outwardly therefrom, said first bearing member including at least two generally vertical bearing surfaces,
      (2) a second bearing member positioned outwardly from the periphery of said transparent cover plate, said second bearing member including at least two vertical bearing surfaces that are adapted to slideably engage the said vertical bearing surfaces of said first bearing member in such a manner that said second bearing member can easily and quickly be lifted out of engagement with said frying pan at its bearing member, and
      (3) means for pivotally connecting said transparent cover plate to said second bearing member whereby the cover plate can be pivoted from an open position away from the frying pan to a closed position overlying the frying pan or to an intermediate stationary position, said pivotal connecting means permitting removal of the transparent cover from said frying pan along with said second bearing member.

2. A frying pan and cover combination according to claim 1 wherein said pivotal connection means includes a coiled spring and shaft arrangement mounted on said second bearing member and arms interconnecting said shaft and said cover plate.

3. A frying pan and cover combination according to claim 1 wherein swiveling arm members interconnect said cover plate and said second bearing member, said arm members being connected to the ends of a shaft that is rotatably mounted on said second bearing member, the rotation of said shaft being controlled by coiled springs surrounding said shaft.

* * * * *